(12) United States Patent
Kimes (10) Patent No.: US 9,249,836 B2
(45) Date of Patent: Feb. 2, 2016

(54) COUPLING ASSEMBLY HAVING REDUCED UNDESIRABLE NOISE AND CONTACT STRESS CAUSED BY A TRANSITION BETWEEN OPERATING MODES OF THE ASSEMBLY

(71) Applicant: Means Industries, Inc., Saginaw, MI (US)

(72) Inventor: John W. Kimes, Wayne, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 14/449,312

(22) Filed: Aug. 1, 2014

(65) Prior Publication Data

US 2015/0047944 A1    Feb. 19, 2015

Related U.S. Application Data

(60) Provisional application No. 61/866,121, filed on Aug. 15, 2013.

(51) Int. Cl.
*F16D 41/12* (2006.01)
*F16D 3/12* (2006.01)

(52) U.S. Cl.
CPC ............... *F16D 3/12* (2013.01); *F16D 41/125* (2013.01); *F16D 2300/22* (2013.01)

(58) Field of Classification Search
CPC ... F16D 3/12; F16D 41/12; F16D 2041/0603; F16D 41/069
USPC ..................... 192/46; 74/576; 1/46
See application file for complete search history.

(56) References Cited

U.S. PATENT DOCUMENTS

| | | |
|---|---|---|
| 4,200,002 A | 4/1980 | Takahashi |
| 5,070,978 A | 12/1991 | Pires |
| 5,382,203 A | 1/1995 | Bellman |
| 5,449,057 A | 9/1995 | Frank |
| 5,597,057 A | 1/1997 | Ruth et al. |
| 5,806,643 A | 9/1998 | Fitz |
| 5,871,071 A | 2/1999 | Sink |
| 5,918,715 A | 7/1999 | Ruth et al. |
| 5,927,455 A | 7/1999 | Baker et al. |
| 5,954,174 A | 9/1999 | Costin |

(Continued)

OTHER PUBLICATIONS

Office Action; related U.S. Appl. No. 14/457,245; date of notification Jul. 10, 2015.

(Continued)

*Primary Examiner* — Rodney H Bonck
*Assistant Examiner* — Stacey Fluhart
(74) *Attorney, Agent, or Firm* — Brooks Kushman P.C.

(57) ABSTRACT

A coupling assembly such as a ratcheting-type, one-way clutch assembly having reduced undesirable noise and contact stress caused by a transition between operating modes of the assembly is provided. The assembly includes at least one set of elements disposed between coupling faces of members of the assembly. Each set of elements includes a movable locking element and a plurality of movable impact energy storage elements disposed at angularly spaced positions about a rotary axis to dampen rotation between the members in stages prior to engagement of the locking element with respective shoulders of each member. The storage elements absorb and store impact energy in stages to reduce undesirable noise and contact stress in a controlled fashion.

19 Claims, 4 Drawing Sheets

(56) References Cited

U.S. PATENT DOCUMENTS

| | | | |
|---|---|---|---|
| 5,957,249 A * | 9/1999 | Yamazaki et al. | 188/218 XL |
| 5,964,331 A | 10/1999 | Reed et al. | |
| 5,979,627 A | 11/1999 | Ruth et al. | |
| 6,065,576 A | 5/2000 | Shaw et al. | |
| 6,116,394 A | 9/2000 | Ruth | |
| 6,125,980 A | 10/2000 | Ruth et al. | |
| 6,129,190 A | 10/2000 | Reed et al. | |
| 6,186,299 B1 | 2/2001 | Ruth | |
| 6,193,038 B1 | 2/2001 | Scott et al. | |
| 6,244,965 B1 | 6/2001 | Klecker et al. | |
| 6,289,766 B1 * | 9/2001 | Sukeshita et al. | 74/576 |
| 6,290,044 B1 | 9/2001 | Burgman et al. | |
| 6,333,112 B1 | 12/2001 | Field et al. | |
| 6,386,349 B1 | 5/2002 | Welch | |
| 6,481,551 B1 | 11/2002 | Ruth | |
| 6,505,721 B1 | 1/2003 | Welch | |
| 6,571,926 B2 | 6/2003 | Pawley | |
| 6,730,263 B2 | 5/2004 | Ernst et al. | |
| 6,854,577 B2 | 2/2005 | Ruth | |
| 7,025,188 B2 | 4/2006 | Lindenschmidt et al. | |
| 7,100,756 B2 | 9/2006 | Kimes et al. | |
| 7,258,214 B2 | 8/2007 | Pawley et al. | |
| 7,320,240 B2 | 1/2008 | Pederson | |
| 7,344,010 B2 | 3/2008 | Fetting, Jr. et al. | |
| 7,383,930 B2 | 6/2008 | Kimes et al. | |
| 7,416,621 B2 | 8/2008 | Knott | |
| 7,448,481 B2 | 11/2008 | Kimes et al. | |
| 7,451,862 B2 | 11/2008 | Kimes et al. | |
| 7,455,156 B2 | 11/2008 | Kimes et al. | |
| 7,455,157 B2 | 11/2008 | Kimes et al. | |
| 7,484,605 B2 | 2/2009 | Pawley et al. | |
| 7,661,518 B2 | 2/2010 | Kimes | |
| 7,690,492 B2 | 4/2010 | Gooden et al. | |
| 8,007,396 B2 | 8/2011 | Kimes et al. | |
| 8,079,453 B2 | 12/2011 | Kimes | |
| 8,187,141 B2 | 5/2012 | Goleski et al. | |
| 8,424,204 B2 | 4/2013 | Geiman | |
| 8,491,439 B2 | 7/2013 | Kimes | |
| 8,491,440 B2 | 7/2013 | Kimes et al. | |
| 8,500,594 B2 | 8/2013 | Sefcik et al. | |
| 8,535,605 B2 | 9/2013 | Orth et al. | |
| 8,602,189 B2 | 12/2013 | Shaw et al. | |
| 2006/0021838 A1 | 2/2006 | Kimes et al. | |
| 2007/0084694 A1 | 4/2007 | Doherty et al. | |
| 2008/0041687 A1 * | 2/2008 | Cali et al. | 192/46 |
| 2008/0135369 A1 | 6/2008 | Meier | |
| 2008/0188338 A1 | 8/2008 | Kimes et al. | |
| 2009/0062058 A1 | 3/2009 | Kimes et al. | |
| 2009/0098970 A1 | 4/2009 | Kimes | |
| 2009/0233755 A1 | 9/2009 | Kimes | |
| 2010/0105515 A1 | 4/2010 | Goleski et al. | |
| 2011/0297500 A1 | 12/2011 | Shaw et al. | |
| 2012/0145505 A1 | 6/2012 | Kimes | |
| 2012/0149518 A1 | 6/2012 | Kimes | |
| 2012/0152683 A1 | 6/2012 | Kimes | |
| 2014/0045643 A1 | 2/2014 | Heuver et al. | |

OTHER PUBLICATIONS

Sokolowski, Thomas et al.; "Considerations in Sinter-Brazing PM Components"; Hoeganaes Corporation, Cinnaminson, NJ.

* cited by examiner

COUPLING ASSEMBLY HAVING REDUCED UNDESIRABLE NOISE AND CONTACT STRESS CAUSED BY A TRANSITION BETWEEN OPERATING MODES OF THE ASSEMBLY

CROSS-REFERENCE TO RELATED APPLICATION

This application claims the benefit of U.S. provisional application Ser. No. 61/866,121, filed Aug. 15, 2013.

TECHNICAL FIELD

This invention generally relates to coupling assemblies such as ratcheting, one-way clutch assemblies and, in particular, to such coupling assemblies having reduced undesirable noise and contact stress caused by a transition between operating modes of the assemblies.

Overview

Coupling assemblies such as clutches are used in a wide variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "freewheeling" of the driving member in the second direction relative to the driven member is also known as the "overrunning" condition.

One type of one-way clutch includes coaxial driving and driven plates having generally planar clutch faces in closely spaced, juxtaposed relationship. A plurality of recesses or pockets is formed in the face of the driving plate at angularly spaced locations about the axis, and a strut or pawl is disposed in each of the pockets. Multiple recesses or notches are formed in the face of the driven plate and are engageable with one or more of the struts when the driving plate is rotating in a first direction. When the driving plate rotates in a second direction opposite the first direction, the struts disengage the notches, thereby allowing freewheeling motion of the driving plate with respect to the driven plate.

When the driving plate reverses direction from the second direction to the first direction, the driving plate typically rotates relative to the driven plate until the clutch engages. As the amount of relative rotation increases, the potential for an engagement noise also increases.

In a powershift transmission, tip-in clunk is one of most difficult challenges due to absence of a torque converter. When the driver tips-in, i.e., depresses the accelerator pedal following a coast condition, gear shift harshness and noise, called clunk, are heard and felt in the passenger compartment due to the mechanical linkage, without a fluid coupling, between the engine and powershift transmission input. Tip-in clunk is especially acute in a parking-lot maneuver, in which a vehicle coasting at low speed is then accelerated in order to maneuver into a parking space.

In order to achieve good shift quality and to eliminate tip-in clunk, a powershift transmission should employ a control strategy that is different from that of a conventional automatic transmission. The control system should address the unique operating characteristics of a powershift transmission and include remedial steps to avoid the objectionable harshness yet not interfere with driver expectations and performance requirements of the powershift transmission. There is a need to eliminate shift harshness and noise associated with tip-in clunk in a powershift transmission.

For purposes of this disclosure, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A pocket plate may be provided with angularly disposed recesses or pockets about the axis of the one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Some U.S. patents related to the present invention include: U.S. Pat. Nos. 5,070,978; 5,449,057; 5,806,643; 5,871,071; 5,918,715; 5,964,331; 5,927,455; 5,979,627; 6,065,576; 6,116,394; 6,125,980; 6,129,190; 6,186,299; 6,193,038; 6,244,965; 6,386,349; 6,481,551; 6,505,721; 6,571,926; 6,854,577; 7,258,214; 7,344,010; and 7,484,605.

Yet still other related U.S. patents include: U.S. Pat. Nos. 4,200,002; 5,954,174; and 7,025,188.

U.S. Pat. No. 6,854,577 discloses a sound-dampened, one-way clutch including a plastic/steel pair of struts to dampen engagement clunk. The plastic strut is slightly longer than the steel strut. This pattern can be doubled to dual engaging. This approach has had some success. However, the dampening function stopped when the plastic parts became exposed to hot oil over a period of time.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

Other U.S. patent documents related to at least one aspect of the present invention includes U.S. Pat. Nos. 8,491,440; 8,491,439; 8,187,141; 8,079,453; 8,007,396; 7,690,492; 7,661,518; 7,455,157; 7,455,156; 7,451,862; 7,448,481; 7,383,930, 7,100,756; and 6,290,044; and U.S. published application Nos. 2012/0152683; 2012/0149518; 2012/0145505; 2010/0105515; 2009/0233755; 2009/0098970; 2009/0062058; 2008/0188338; and 2006/0021838.

SUMMARY OF EXAMPLE EMBODIMENTS

An object of at least one embodiment of the present invention is to provide a coupling assembly such as a ratcheting, one-way clutch assembly having reduced undesirable noise and contact stress caused by a transition between operating modes of the assembly.

In carrying out the above object and other objects of at least one embodiment of the present invention, an assembly comprising first and second members including first and second coupling faces, respectively, in closed-spaced opposition with one another is provided. At least one of the members is mounted for rotation about an axis. The first coupling face has a plurality of first recesses. Each of the first recesses defines a load-bearing first shoulder. The second coupling face has a plurality of second recesses. Each of the second recesses defines a load-bearing second shoulder. The assembly further comprises at least one set of elements disposed between the coupling faces of the members. Each set of elements includes a locking element movable between first and second positions. The first position is characterized by abutting engagement of the locking member with a respective shoulder of each member and the second position is characterized by non-abutting engagement of the locking element with at least one of the members. Each set of elements also includes a plurality of impact energy storage elements disposed at angularly spaced positions about the axis to dampen the rotation between the members in stages prior to engagement of the locking element with the respective shoulders of each member. A first one of the storage elements dampens the rotation during rotary movement through a first angle which corresponds to a first stage and a second one of the storage elements dampens the rotation during rotary movement through a second angle which corresponds to a second stage. The storage elements absorb and store impact energy in stages to reduce undesirable noise and contact stress in a controlled fashion.

The first storage element may dampen the rotation during the second stage.

Each of the storage elements has a length wherein the first storage element may deflect a first amount along its length after rotary movement through the first angle and the second storage element may deflect a second amount along its length after rotary movement through the second angle.

Each of the storage elements may carry elastomeric material defining opposite end sections of the storage element. Each storage element may be movable between third and fourth positions. The third position may be characterized by abutting engagement of the opposite end sections with respective shoulders of each member and the fourth position may be characterized by non-abutting engagement of one of its end sections with at least one of the members. Each end section may be configured to deflect upon abutting engagement with a respective shoulder.

The locking element and the storage elements may be disposed at angularly spaced positions about the axis at generally equidistant radial locations relative to the axis.

A third one of the storage elements may dampen the rotation during rotary movement through a third angle which corresponds to a third stage of the stages.

The first and second storage elements may dampen the rotation during the third stage.

A fourth one of the storage elements may dampen the rotation during rotary movement through a fourth angle which corresponds to a fourth stage of the stages.

The first, second and third storage elements may dampen the rotation during the fourth stage.

Each of the storage elements may include a rigid insert and an elastomeric outer covering layer surrounding and bonded to the insert.

The insert may be a die-casting formed in a metal injection molding (MIM) process.

The outer covering layer may be molded over the insert.

The assembly may be a clutch assembly such as a one-way clutch assembly.

The one-way clutch assembly may be a ratcheting-type, one-way clutch assembly.

The locking and storage elements may comprise struts wherein the assembly may be a planar coupling assembly.

The locking and storage elements comprise rockers wherein the assembly may be a radial coupling assembly.

The undesirable noise may be engagement clunk.

The assembly may include multiple sets of elements disposed between the coupling faces of the members.

One of the members may be a notch plate and the other of the members may be a pocket plate.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION

Figure 1:
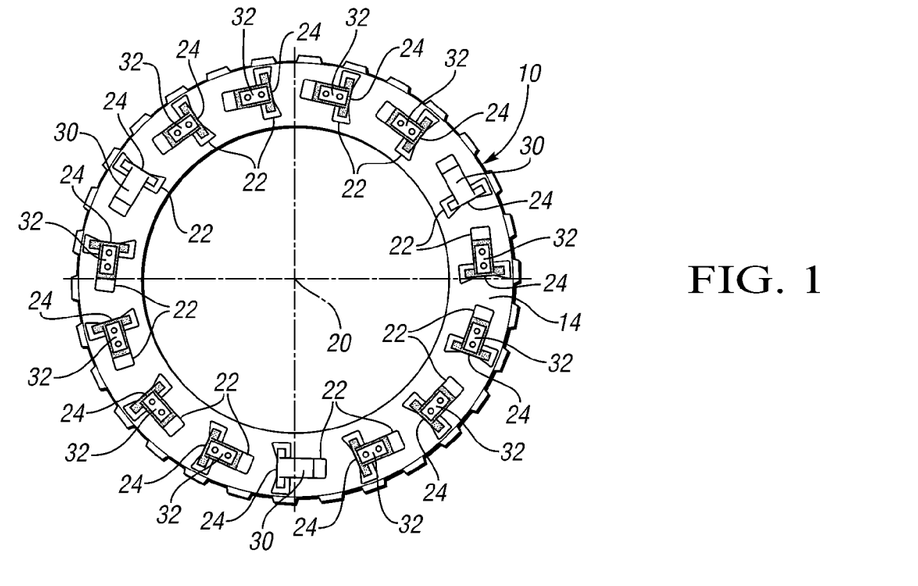
FIG. 1 is a top plan view of an exemplary pocket plate with multiple locking struts and multiple energy storage struts of a planar one-way clutch assembly constructed in accordance with at least one embodiment of the invention.
Figure 2:
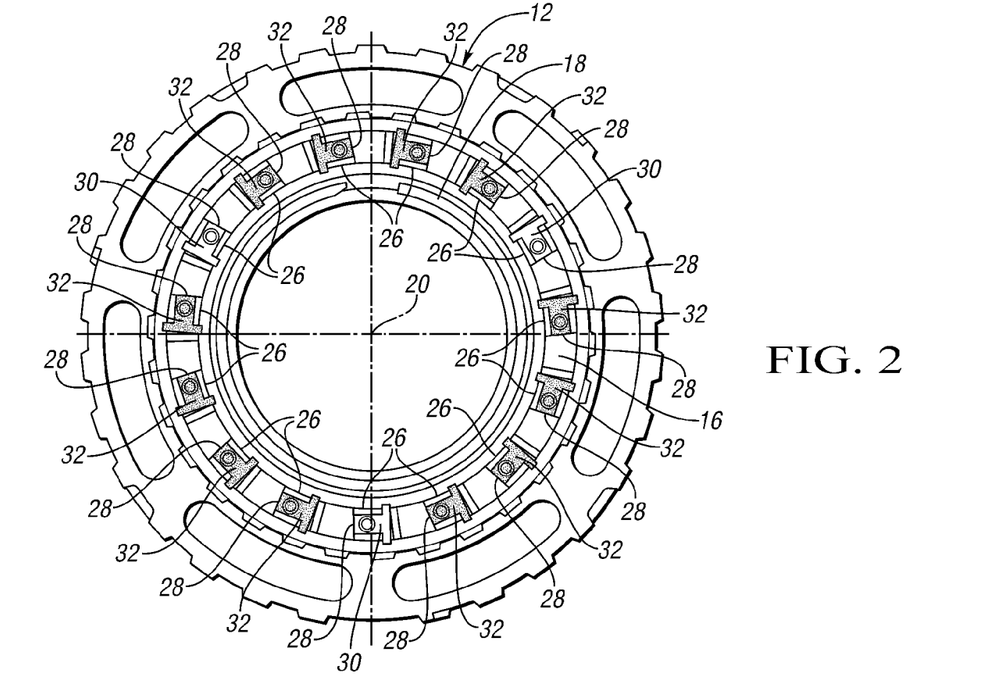
FIG. 2 is a top plan view of an exemplary notch plate with the multiple locking and energy storage struts of the planar one-way clutch assembly.
Figure 3:
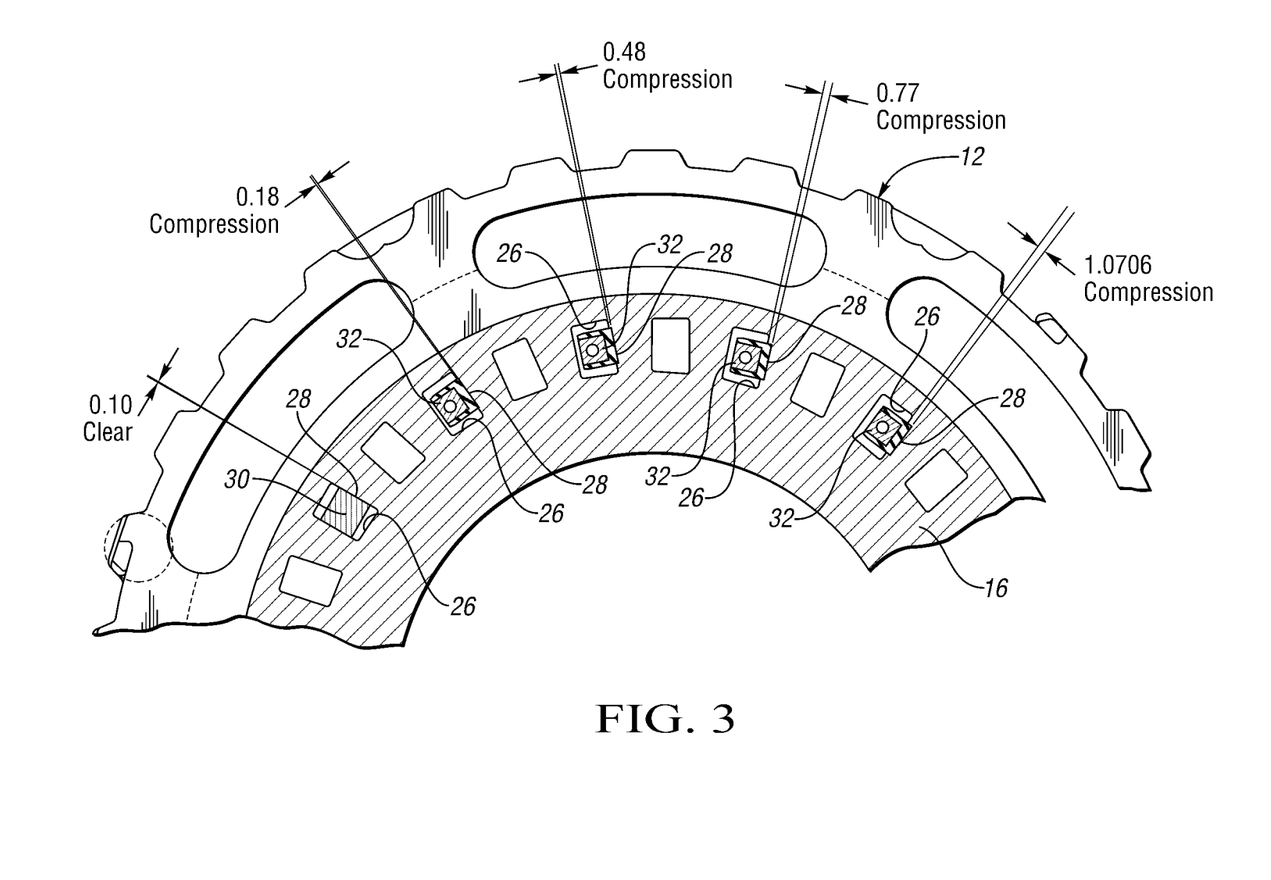
FIG. 3 is an enlarged view, partially broken away and in cross section, of the notch plate of FIG. 2 and showing various amounts of energy storage strut compression when the locking strut is performing its locking function between the notch and pocket plates.

Referring now to FIGS. 1-3, there are illustrated a pocket plate, generally indicated at 10, and a notch plate, generally indicated at 12, of a coupling assembly, such as a ratcheting, one-way clutch assembly, having reduced undesirable noise and contact stress caused by a transition between operating modes of the assembly. More generally, the assembly includes first and second members 10 and 12, respectively, including first and second coupling faces 14 and 16, respectively, in closed-spaced opposition with one another when the members 10 and 12 are assembled and held together by a locking ring 18. At least one of the members 14 and 16 is mounted for rotation about an axis 20. The first coupling face 14 having a plurality of first recesses or pockets 22. Each of the first recesses 22 defines a load-bearing first shoulder 24. The second coupling face 16 has a plurality of second recesses or notches 26. Each notch 26 of the second recesses defines a load-bearing second shoulder 28.

Referring still to FIGS. 1-3, the coupling assembly includes at least one set (three sets are shown in FIGS. 1 and 2) of elements disposed between the coupling faces 14 and 16 of the members 10 and 12, respectively, when the members 10 and 12 are assembled and held together. Each set of elements includes a locking element or metal strut 30 movable between first and second positions. The first position is characterized by abutting engagement of the locking member 30 with a respective shoulder 24,28 of each member 10,12 and the second position is characterized by non-abutting engagement of the locking element 30 with at least one of the members 10 or 12.

Each set of locking elements also include a plurality of impact energy storage elements or rubber struts 32 disposed at angularly spaced positions about the axis 20 to dampen the rotation between the members 10 and 12 in stages prior to engagement of its locking element 30 with the respective shoulders 24 and 28 of each member 10 and 12, respectively.

Figure 4:
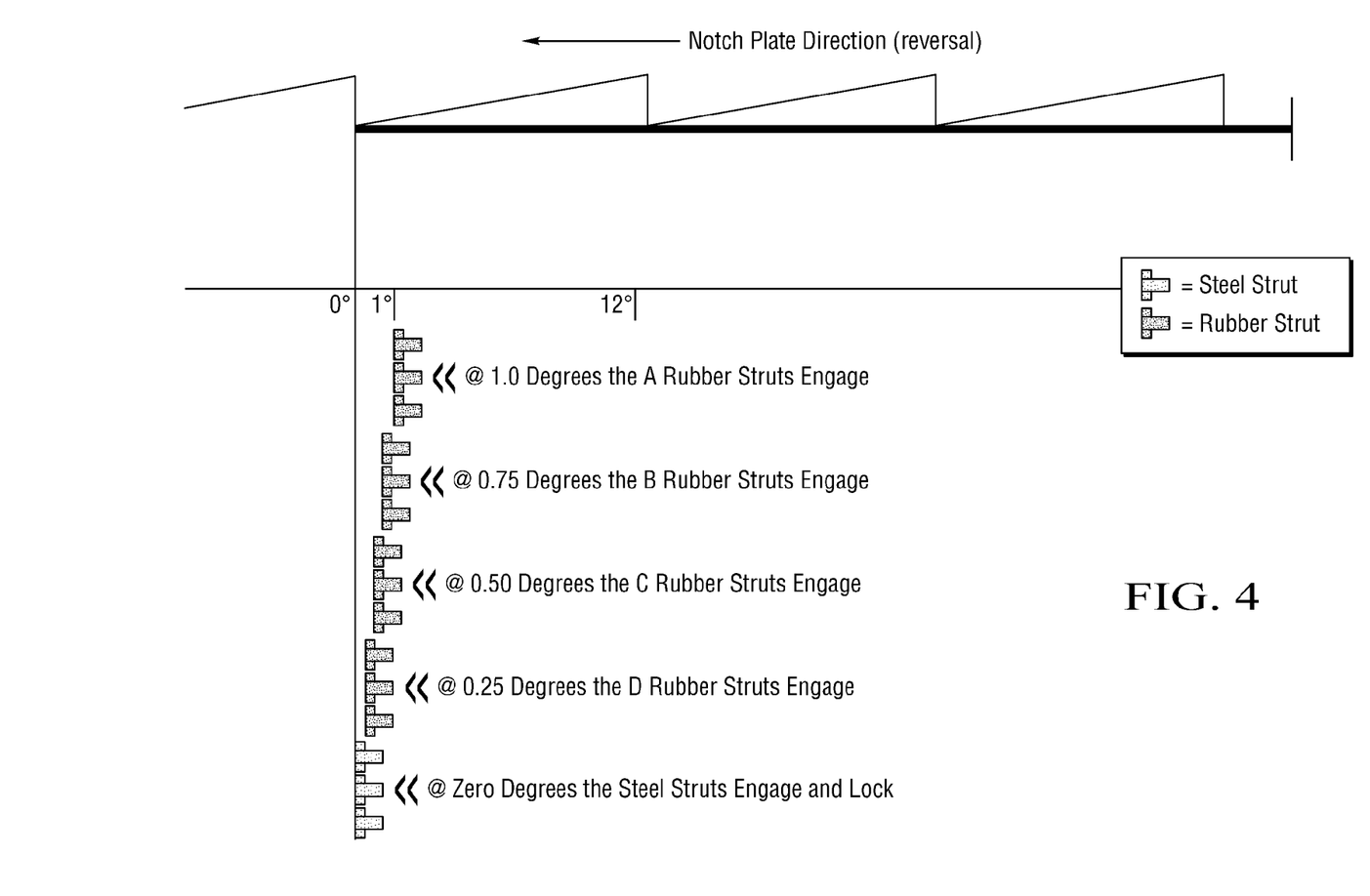
FIG. 4 is a schematic view showing the different angles from zero degrees (at which the locking strut locks) at which the various energy storage struts engage the locking formations of the notch plate.

Referring to FIGS. 3 and 4, a first one (i.e., "A" rubber strut of FIG. 4) of each set of storage elements 32 dampens the rotation during rotary movement through a first angle (by deflection or compressing a total of 1.0706 units) prior to locking engagement to the notch plate 12 by the locking element 30 which corresponds to a first stage.

A second one ("B" rubber strut of FIG. 4) of each set of storage elements 32 (0.77 total compression) dampens the rotation during rotary movement through a second angle which corresponds to a second stage. The first and second storage elements 32 absorb and store impact energy in stages to reduce undesirable noise (such as engagement clunk) and contact stress in a controlled fashion wherein neither one of the storage elements 32 is required to absorb and/or store all of the impact energy by itself thereby extending the useful life of the assembly.

A third one ("C" rubber strut of FIG. 4) of each set of storage elements 32 (0.48 total compression) dampens the rotation during rotary movement through a third angle which corresponds to a third stage of the stages. The first and second storage elements ("A" and "B" rubber struts) also dampen the rotation during the third stage thereby extending the useful life of the assembly.

A fourth one ("D" rubber strut of FIG. 4) of each set of storage elements 32 (0.18 total compression) dampens the rotation during rotary movement through a fourth angle which corresponds to a fourth stage of the stages. The first, second and third storage elements ("A", "B" and "C" rubber struts) dampen the rotation during the fourth stage thereby extending the useful life of the assembly.

The rubber struts 32 are advanced from the metal struts ¼ degree per set. The "D" rubber struts of FIG. 4 will deflect ¼ degree before the locking struts 30 land. The "C" rubber struts of FIG. 4 will deflect ½ degree, the rubber "B" struts of FIG. 4 will deflect ¾ of a degree, and the first rubber struts to take the impact, the "A" rubber struts, will deflect or compress the whole 1 degree before the metal struts 30 take any load. If one has 30 notches in the notch plate 12 and 12 rubber struts and 3 metal struts, the backlash in the clutch assembly relative to just the metal clutches is 360/30/(3/3)=12 degrees.

During the reversal, the rubber "A", "B", "C", and "D" struts will engage first 11 out of 12 times (91.6%).

Each locking element 30 and the energy storage elements 32 are disposed at angularly spaced positions about the axis 20 at generally equidistant radial locations relative to the axis 20.

The designs of FIGS. 1-3 are triple engaging designs. If the dampening solution works and is independent of backlash, then other engagement schemes can be designed like 4, 5 or more sets of struts or elements at a time. The benefit to this approach is a drastic reduction in contact stress that would enable less expensive materials like FC 208 or aluminum for notch plate and pocket plate design. Larger backlash values also reduce the chance of a partial engagement which also enables these materials.

Referring again to FIG. 4, there is illustrated a lock-up pattern for the energy storage (i.e. rubber) struts 32 and the locking (i.e. metal) struts 30. The "A" rubber struts 32 compresses first and the most (i.e. 1.0706) at 1° before the locking struts 30 engages; then the "B" rubber struts 32 (0.77 at 0.75°); then the "C" rubber struts 32 (0.48 at 0.5°); and then the "D" rubber struts 32 (0.18 at 0.25°).

Each locking strut 30 may comprise any suitable rigid material such as metal, (i.e. steel). In accordance with at least one embodiment of the invention, each storage struts 32 (i.e. FIGS. 5 and 6) may comprise any suitable base polymer that displays rubber-like elasticity, such as an unsaturated or saturated rubber material including, but not limited to, a nitrile rubber such as a hydrogenated nitrile butadiene rubber (HNBR). The storage struts 32 are configured to dampen rotation and, consequently, engagement noise of the clutch assembly. For example, a portion or portions of each storage strut 32 such as one or more end portion 34 and 36 and/or middle portions 38 of each storage strut 32 may comprise one or more elastomeric materials, and the remainder of each storage strut 32 may comprise a metal, such as a metal steel insert 40.

Figure 5:
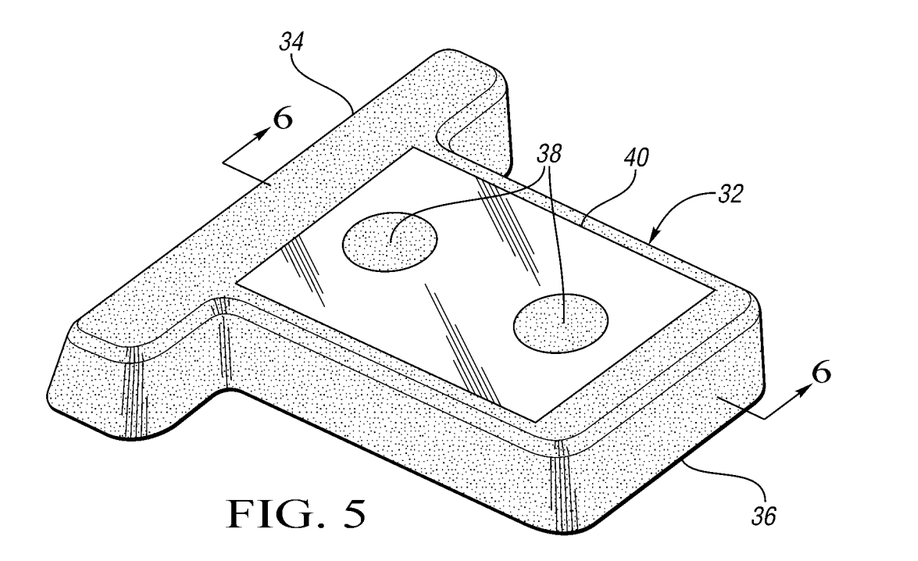
FIG. 5 is a top perspective view of one of the energy storage struts of at least one embodiment of the present invention.
Figure 6:
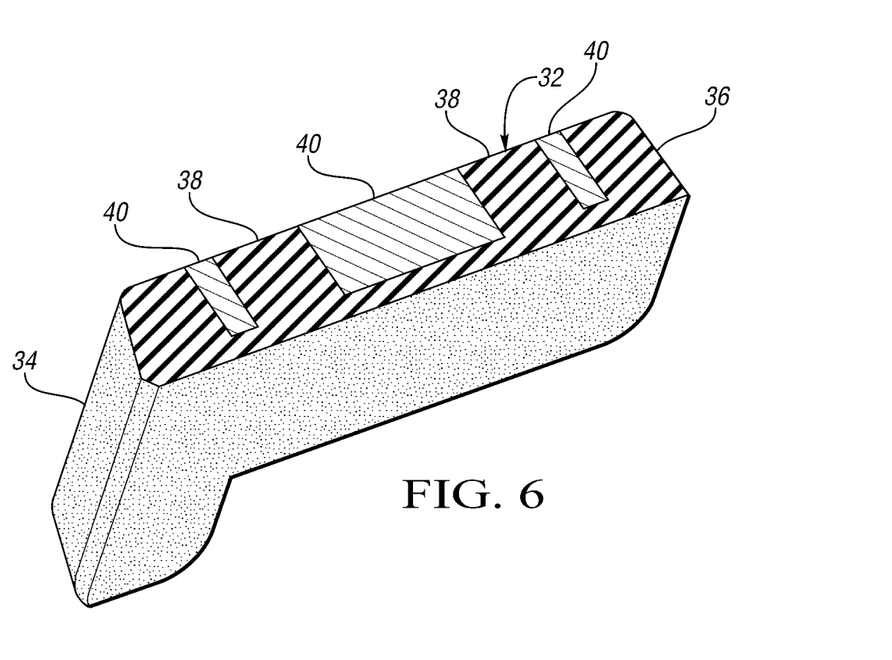
FIG. 6 is a sectional view taken along lines 6-6 of FIG. 5 illustrating an insert and an elastomeric covering layer of the energy storage strut.

Generally, each of the storage elements 32 carries resilient material defining opposite end sections 34 and 36 of the storage element 32. Each storage element 32 is movable between third and fourth positions between the numbers 10 and 12. The third position is characterized by abutting engagement of the opposite end sections 34 and 36 with respective shoulders 24 and 28 of the member 10 and 12, respectively, and the fourth position is characterized by non-abutting engagement of one of its end sections 34 and 36 with at least one of the members 10 or 12. Each end section 34 or 36 is configured to deflect or compress upon abutting engagement with respective shoulders 24 and 28.

In other words, each of the storage elements 32 may include the rigid insert 40 and an elastomeric outer covering layer surrounding and bonded to the insert 40. The insert 40 may be a die-casting formed in a metal injection molding (MIM) process. The outer covering layer is then molded over the insert. The molding may be a thermoset elastomer or a thermoplastic elastomer (TPE) which combines the rubber-like properties of a thermoset elastomer and the processing characteristics of a thermoplastic. The above concept uses synthetic rubber struts with metal inserts. The material properties are stable in hot transmission fluid or oil. In addition, the rubber struts engage and deflect before the steel struts are engaged and lock the members 10 and 12 together. This approach has many rubber struts to absorb the impact energy as opposed to one or possibly two plastic struts. A typical range of operating temperatures for the fluid or oil is −30° to 155° C.

While exemplary embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the struts 30 and 32 of the exemplary clutch assembly may be carried by a driving member of the assembly or a driven member of the assembly. Furthermore, the struts 30 and 32 may be carried by a separate element, such as a carrier plate, that is disposed between the clutch faces of the driving and driven members. In addition, while the struts of the exemplary clutch assembly may be carried by a carrier ring, it will be appreciated that the invention contemplates carrying the struts in the recesses of an inner race or an outer race. Moreover, each strut of the exemplary clutches assemblies may have any suitable configuration depending on whether the assembly is a planar coupling assembly as shown herein or a rocker coupling assembly (not shown). Also, each strut or rocker (in a radial coupling assembly) may have a middle portion that is thicker than each end portion of the strut or rotor.

The above noted design eliminates the need to keep backlash low which leads to multiple metal strut engagement (3, 4, 5 . . . ) which leads to lower stress (higher durability), which leads to lower cost race materials like Aluminum or FC208 PM.

Also, while a preferred base polymer is identified above as HNBR, other acceptable materials include but are not limited to fluoroelastomers, carboxylated nitrile butadiene rubber, nitrile butadiene rubber and ethylene acrylic rubber.

What is claimed is:

1. A coupling assembly comprising:
   first and second members including first and second coupling faces, respectively, in closed-spaced opposition with one another, wherein at least one of the members is mounted for rotation about an axis, the first coupling face having a plurality of first recesses, each of the first recesses defining a load-bearing first shoulder, the second coupling face having a plurality of second recesses, each of the second recesses defining a load-bearing second shoulder; and
   at least one set of elements disposed between the coupling faces of the members, each set of elements including:
      a locking element movable between first and second positions, the first position being characterized by abutting engagement of the locking element with a respective shoulder of each member and the second position being characterized by non-abutting engagement of the locking element with at least one of the members; and
      a plurality of impact energy storage elements disposed at angularly spaced positions about the axis to dampen the rotation between the members in stages prior to engagement of the locking element with the respective shoulders of each member, wherein a first one of the storage elements dampens the rotation during rotary movement through a first angle which corresponds to a first stage and a second one of the storage elements dampens the rotation during rotary movement through a second angle which corresponds to a second stage and wherein the storage elements absorb and store impact energy in stages.

2. The assembly as claimed in claim 1, wherein the first storage element dampens the rotation during the second stage.

3. The assembly as claimed in claim 1, wherein each of the storage elements has a length and wherein the first storage element deflects a first amount along the length of the first storage element after rotary movement through the first angle and the second storage element deflects a second amount along a length of the second storage element after rotary movement through the second angle.

4. The assembly as claimed in claim 1, wherein each of the storage elements carries elastomeric material defining opposite end sections of the storage element, each storage element being movable between third and fourth positions, the third position being characterized by abutting engagement of the opposite end sections with the respective shoulders of each member and the fourth position being characterized by non-abutting engagement of one of the end sections of each member with at least one of the members, each end section being configured to deflect upon abutting engagement with the respective shoulder.

5. The assembly as claimed in claim 1, wherein the locking element and the storage elements are disposed at angularly spaced positions about the axis at generally equidistant radial locations relative to the axis.

6. The assembly as claimed in claim 1, wherein a third one of the storage elements dampens the rotation during rotary movement through a third angle which corresponds to a third stage of the stages.

7. The assembly as claimed in claim 6, wherein the first and second storage elements dampen the rotation during the third stage.

8. The assembly as claimed in claim 6, wherein a fourth one of the storage elements dampens the rotation during rotary movement through a fourth angle which corresponds to a fourth stage of the stages.

9. The assembly as claimed in claim 8, wherein the first, second and third storage elements dampen the rotation during the fourth stage.

10. The assembly claimed in claim 1, wherein each of the storage elements includes a rigid insert and an elastomeric outer covering layer surrounding and bonded to the insert.

11. The assembly as claimed in claim 10, wherein the insert is a die-casting formed in a metal injection molding (MIM) process.

12. The assembly as claimed in claim 10, wherein the outer covering layer is molded over the insert.

13. The assembly claimed in claim 1, wherein the assembly is a clutch assembly.

14. The assembly as claimed in claim 13, wherein the clutch assembly is a one-way clutch assembly.

15. The assembly as claimed in claim 14, wherein the one-way clutch assembly is a ratcheting-type, one-way clutch assembly.

16. The assembly as claimed in claim 1, wherein the locking and storage elements comprise struts and wherein the assembly is a planar coupling assembly.

17. The assembly as claimed in claim 1, wherein the locking and storage elements comprise rockers and wherein the assembly is a radial coupling assembly.

18. The assembly as claimed in claim 1, wherein the assembly includes multiple sets of elements disposed between the coupling faces of the members.

19. The assembly as claimed 1, wherein one of the members is a notch plate and the other of the members is a pocket plate.

* * * * *